United States Patent
Hart et al.

(10) Patent No.: US 12,062,107 B2
(45) Date of Patent: Aug. 13, 2024

(54) SOCIAL DISTANCING METHODS AND DEVICES

(71) Applicants: William Hart, Aptos, CA (US); Edmond A. DeFrank, Northridge, CA (US); Antonio DeFrank, Northridge (CA); Nicolas DeFrank, Northridge, CA (US); Allen Mark Jones, Imperial Beach, CA (US)

(72) Inventors: William Hart, Aptos, CA (US); Edmond A. DeFrank, Northridge, CA (US); Antonio DeFrank, Northridge (CA); Nicolas DeFrank, Northridge, CA (US); Allen Mark Jones, Imperial Beach, CA (US)

( * ) Notice: Subject to any disclaimer, the term of this patent is extended or adjusted under 35 U.S.C. 154(b) by 0 days.

(21) Appl. No.: 18/227,961

(22) Filed: Jul. 30, 2023

(65) Prior Publication Data

US 2023/0385972 A1 Nov. 30, 2023

Related U.S. Application Data

(63) Continuation of application No. 17/887,449, filed on Aug. 13, 2022, now Pat. No. 11,715,168, which is a
(Continued)

(51) Int. Cl.
*G06Q 50/26* (2024.01)
*B64C 39/02* (2023.01)
(Continued)

(52) U.S. Cl.
CPC ......... *G06Q 50/265* (2013.01); *B64C 39/024* (2013.01); *G05D 1/0055* (2013.01);
(Continued)

(58) Field of Classification Search
CPC .. G06Q 50/265; B64C 39/024; G05D 1/0055; G06V 20/17; G06V 20/52; G06V 40/70;
(Continued)

(56) References Cited

U.S. PATENT DOCUMENTS 11,414,189 B2 * 8/2022 DeFrank ................. H04W 4/38
11,715,168 B2 * 8/2023 DeFrank .............. G06Q 50/265
701/3

* cited by examiner

Primary Examiner — Yonel Beaulieu
(74) Attorney, Agent, or Firm — Edmond DeFrank

(57) ABSTRACT

The embodiments disclose a method including providing an aerial drone coupled wirelessly to a social distancing application on a user digital device, wherein the drone is coupled to solar cell panels for recharging its batteries, providing a strobe light coupled to the drone for signaling an S.O.S. automatically in emergency situations, cellular communication device coupled to the drone for transmitting and receiving messages from the social distancing application, wherein the drone includes a cellular signal strength sensor to automatically move to a location to boost cellular signal strength, and providing at least one camera for capturing images and videos during user directed reconnaissance, drone sensors to detect and measure aerosols including biologics and DNA in an area, electromagnetic fields, barometric pressure, humidity, ambient temperature, wind speed and direction, detection and identification devices to detect unnatural sounds, to analyze and identify manmade, animal and environmental objects and conditions using computer vision.

20 Claims, 13 Drawing Sheets

Related U.S. Application Data continuation of application No. 17/232,133, filed on Apr. 15, 2021, now Pat. No. 11,414,189.

(60) Provisional application No. 63/010,650, filed on Apr. 15, 2020.

(51) Int. Cl.
*G05D 1/00* (2024.01)
*G06V 20/17* (2022.01)
*G06V 20/52* (2022.01)
*G06V 40/70* (2022.01)
*H04W 4/38* (2018.01)
*H04W 4/90* (2018.01)
*B64U 50/19* (2023.01)
*B64U 80/60* (2023.01)
*B64U 101/00* (2023.01)

(52) U.S. Cl.
CPC .............. *G06V 20/17* (2022.01); *G06V 20/52* (2022.01); *G06V 40/70* (2022.01); *H04W 4/38* (2018.02); *H04W 4/90* (2018.02); *B64U 50/19* (2023.01); *B64U 80/60* (2023.01); *B64U 2101/00* (2023.01)

(58) Field of Classification Search
CPC .......... H04W 4/38; H04W 4/90; B64U 50/19; B64U 80/60; B64U 2101/00; B64U 2101/20; B64U 2101/30; Y02T 50/50; B64D 43/00
See application file for complete search history.

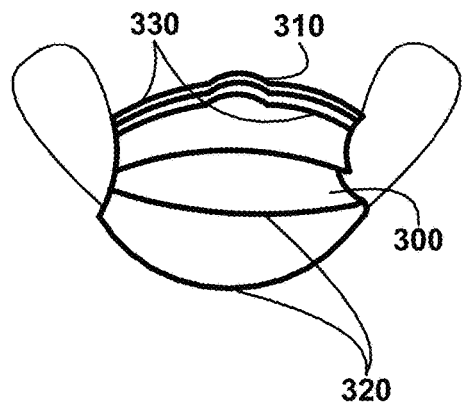
FIG. 3A
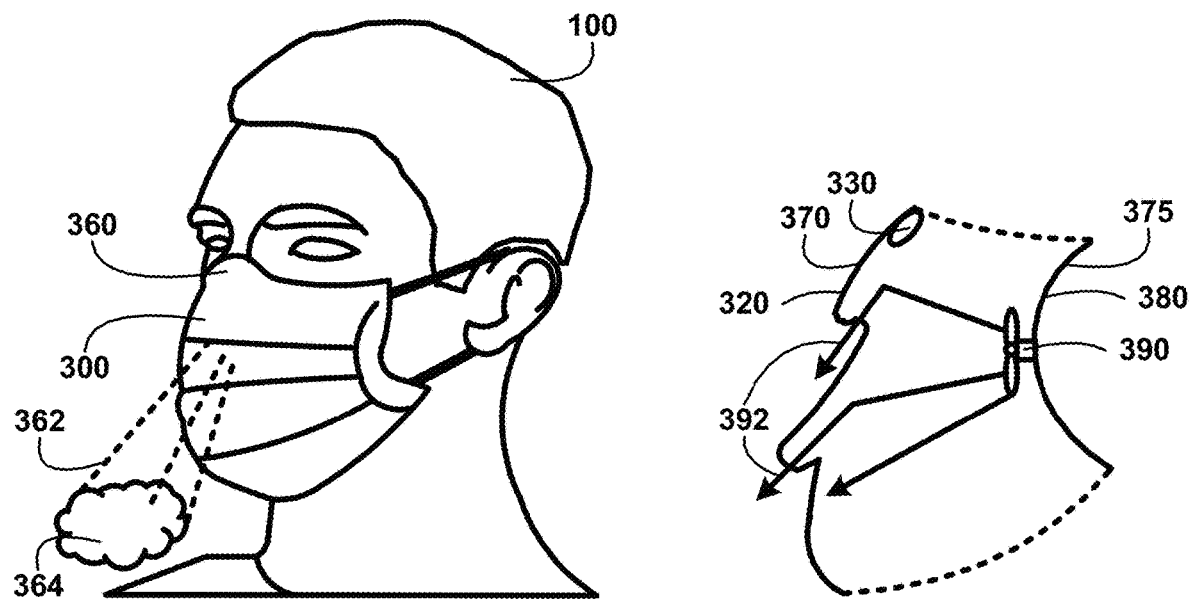
FIG. 3B
FIG. 3C

SOCIAL DISTANCING METHODS AND DEVICES

CROSS-REFERENCED TO RELATED APPLICATIONS

This Patent Application is a Continuation and claims priority to United States Patent Application entitled: "SOCIAL DISTANCING METHODS AND DEVICES", U.S. patent application Ser. No. 17/887,449 filed on Aug. 13, 2022 filed by Edmond A. DeFrank et. al., the U.S. Patent Application being incorporated herein by reference, which is a continuation of and claims priority to United States Patent Application entitled: "SOCIAL DISTANCING METHODS AND DEVICES", U.S. patent application Ser. No. 17/232,133 filed on Apr. 15, 2021 filed by Edmond A. DeFrank et. al., the U.S. Patent Application being incorporated herein by reference, which is based on U.S. Provisional Patent Application Ser. No. 63/010,650 filed Apr. 15, 2020, entitled "SOCIAL DISTANCING METHODS AND DEVICES", by Edmond A. DeFrank et. al., the U.S. Patent Application being incorporated herein by reference.

BACKGROUND

Crisis conditions make it difficult for people to remain compliant with orders from public authorities. Finding ways to deal with restrictions and still cope with the realities of daily life. Protecting themselves from the actions of others and any dangers they may represent. Being thoughtful of yet others that maybe having a more difficult time dealing with the issues confronting them. Obeying orders to report those that are intentionally not obeying orders of authorities and putting others in danger.

BRIEF DESCRIPTION OF THE DRAWINGS

FIG. 3A shows for illustrative purposes only an example of a facial mask wirelessly coupled to a user's cell phone configured to initiate protection devices part 1 of one embodiment.

FIG. 3B shows for illustrative purposes only an example of a facial mask wirelessly coupled to a user's cell phone configured to initiate protection devices part 2 of one embodiment.

FIG. 3C shows for illustrative purposes only an example of a facial mask wirelessly coupled to a user's cell phone configured to initiate protection devices part 3 of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a social distancing method and devices is described for illustrative purposes and the underlying system can apply to any number and multiple types digital applications. In one embodiment of the present invention, the social distancing method and devices can be configured using cell signals for determining a user 100 is getting with 6 feet of another person. The social distancing method and devices can be configured to include a facial mask coupled to a user's cell phone configured to initiate protection devices and can be configured to include signaling alerts to other including enforcement agencies that the user 100 is entering a restricted area using the present invention.

Figure 1:
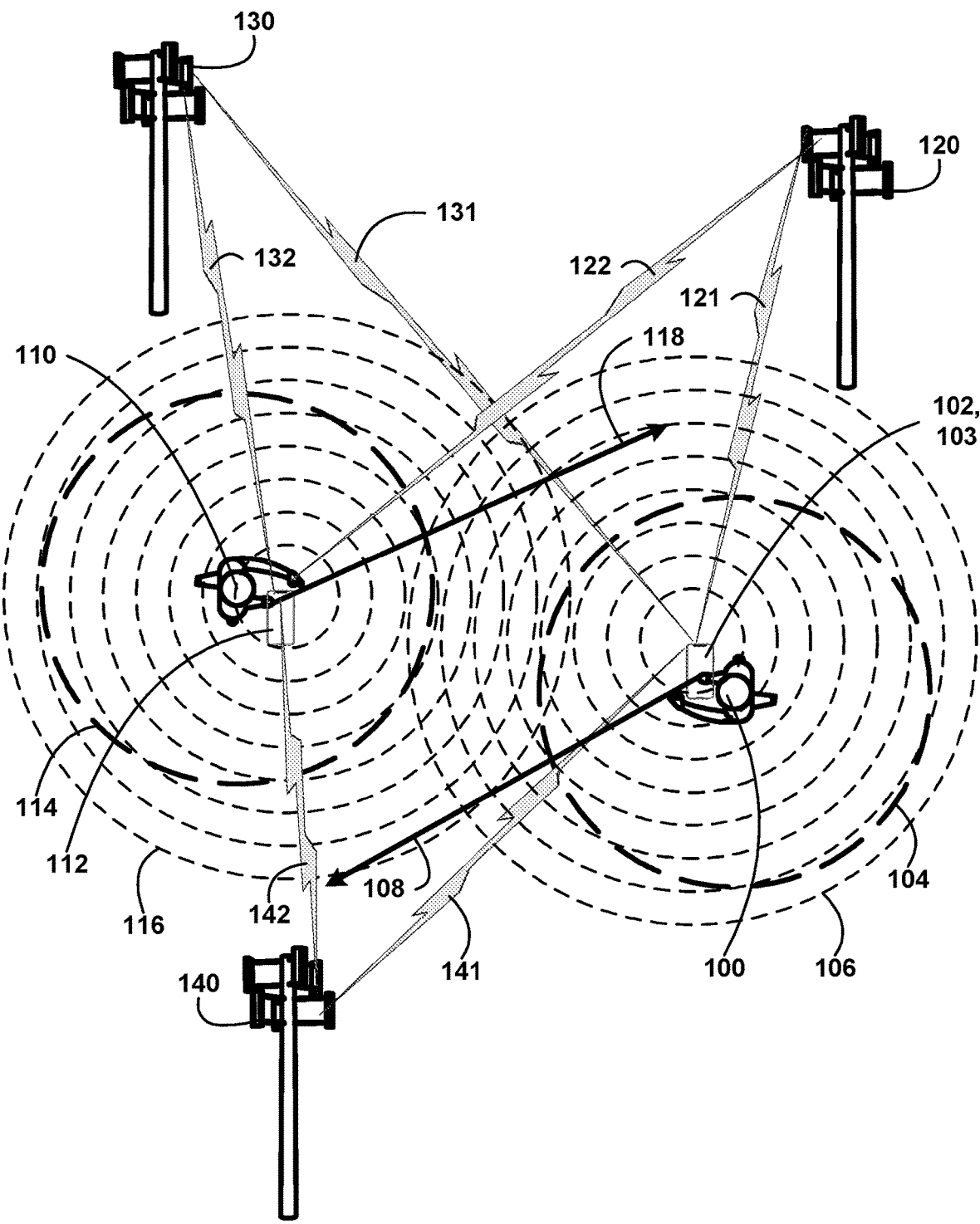
FIG. 1 shows for illustrative purposes only an example of a social distancing application of one embodiment.

Social Distancing Application:

FIG. 1 shows for illustrative purposes only an example of a social distancing application of one embodiment. FIG. 1 shows a social distancing application 103 using cell signals for determining a user 100 is getting within 6 feet of another person. In one embodiment the user's cell phone 102 with the social distancing application 103 is receiving cell signals 121, 131, and 141 from nearby cell towers 120, 130 and 140. The social distancing application 103 is configured for using triangulation for pinpointing the user's physical location. FIG. 1 also shows a user's 6 ft. social distancing perimeter 104 and user's cell phone sending and receiving signals 106. Showing in FIG. 1 is the other person 110, the other person's cell phone 112, other person's 6 ft. social distancing perimeter 114 and the other person's cell phone sending and receiving signals 116. The social distancing application 103 can detect the other person's cell phone signals even when the other person's phone does not have the social distancing application 103.

The social distancing application 103 is also configured for receiving signals 122, 132, and 142 from nearby cell towers 120, 130 and 140 and triangulation for pinpointing another person's cell phone in proximity within a range of 3 to 5 meters from the user's cell phone 102. The social distancing application 103 is configured for using the user's cell phone 102 magnetometer to calculate the direction to the other person's cell phone 112. In this example the other person is closing in on the user's location as determined by the social distancing application 103. A text message is generated and displayed on the user's cell phone 102 directing the user 100 to change their path to the left to avoid coming within 6 feet of the other persons.

This method of maintaining a safe social distance from other persons functions out of doors and inside buildings for example grocery stores and markets where a user 100 is shopping for essential food supplies, medical offices where a user 100 may be keeping an appointment with their doctor, government office for attending to an agency request. This method of maintaining a safe social distance from other persons functions out of doors for example while a user 100 is going for a walk for exercise and relieve stress from a job furlough due to a virus outbreak, natural disaster or other cause.

In another embodiment the social distancing application 103 uses GPS coordinates from the user's cell phone 102 for pinpointing the user's location and is configured is also configured for receiving GPS signals from other person's cell phone in proximity within a range of 3 to 5 meters from the user's cell phone 102. The social distancing application 103 is configured for using the cell phone magnetometer to calculate the direction to the other person's cell phone. In this example the other person is closing in on the user's location as determined by the social distancing application 103. A text message is generated and displayed on the user's cell phone 102 directing the user 100 to change their path to the left to avoid coming within 6 feet of the other persons.

In yet another embodiment the same functions are performed using near-field communication transceiver signals from other cell phones in proximity to the user's cell phone 102. The social distancing application 103 is configured for using radio-frequency identification (RFID) for performing the same functions in still another embodiment.

In still another embodiment the social distancing application 103 is configured for using the video function of the user's cell phone 102 in the background for capturing the relative movements of other persons in proximity of the user's cell phone 102. The social distancing application 103 is configured for continuously measuring the height and other biometric characteristics of the other persons and calculating any change in the calculated measurement for determining if any of the other persons are closing in on the user 100 and generating a text message and displaying on the user's cell phone 102 to change their direction of movement or positon to avoid coming within 6 feet of the other person(s) based on the directions determined by the user's cell phone 102 magnetometer. The embodiments provide the user 100 with alternative means for determining their proximity to other persons to maintain appropriate social distancing for adapting to conditions both out of doors and inside buildings of one embodiment.

In another embodiment the social distancing application 103 is configured for analyzing the user's supplies using photo taken with the cell phone camera. The supplies photos are processed using OCR and a database of images of user 100 supplies inputted by the user 100 to determine the current inventory of supplies and prepare an essential shopping list. The social distancing application 103 also performs a search of nearby stores to determine the best advertised prices to advise the user 100 on probable costs of the essential supplies purchases. The social distancing application 103 also prepares a suggested travel route to conserve fuel and time. The social distancing application 103 also searches current live traffic reports to estimate the number of vehicles in proximity to the stores to anticipate potential crowded shopping at those stores. The social distancing application 103 periodic researches the live traffic reporting to adjust the estimates of potential crowded shopping at those stores. The social distancing application 103 also checks the crowd based self-reporting to check crowding levels reported at those stores and availability of the essentials supplies at those stores. The availability of the essentials supplies at those stores can be self-reported by for example a stock boy currently stock the shelves with toilet paper, eggs and other items difficult to find. Food store may begin using the social distancing application 103 for notifying for example elderly users of less congested shopping hours and when essential items are available.

In another embodiment the social distancing application 103 checks the need for essential supplies with friends and family members to reduce the number and frequency of each other having to make trips away from home. The goal is to avoid increasing their potential exposure to other people, particularly those friends and family members at higher risk of getting infected or suffering more severe consequences of an infection. In another embodiment the social distancing application 103 checks the conditions detected of friends and family members wearing a protective mask to assist them in case they show any symptoms or adverse conditions. The user's social distancing application 103 detects nearby Bluetooth phones, devices and apps indicating the approximate distance and direction even when the other person's phone does not have the social distancing application 103.

The social distancing application 103 is configured to include features and devices for facial recognition and detect biometric characteristic of a person and their movements. For example the facial recognition can determine whether the person is known to the user from images of friends, family members and business associates to alert the user that the particular person is approaching and to offer a greeting. In another example the facial recognition is used to assess the emotional state of the nearby person. For example do they have a worried look, a happy expression, do they appear angry, does there expression reflect a threat to the user. In another example determine if the detected biometric characteristic of a person and their movements indicate they are running towards the user, casually walking past the user and do their movements indicate a threat to the user.

The social distancing application 103 is configured to operate free of connected wire to another device. The social distancing application 103 is configured to assist the user with communications, apps and learning about various issues including any crisis and the details that may be affecting the user. The social distancing application 103 is configured for incorporating artificial intelligence, augmented reality, mixed reality and other features available for adjusting to changes in their daily routine that may be imposed for dealing with a crisis or just normal everyday life.

The social distancing application 103 is configured to include voice recognition. Voice recognition is used for identifying the user and unlocking the function of the social distancing application 103. Voice recognition is used for identifying other persons near the user.

The social distancing application 103 is configured in another embodiment to activate a plurality of ultraviolet lights incorporated into wearable apparel. The plurality of ultraviolet lights is configured to include individual rechargeable batteries. The wearing apparel when not being worn can be placed on a hanger and hung inside a wireless recharging station configured as a garment bag that can be hung inside a clothes closets, armoires and wardrobe closets. The wireless recharging station garment bag is plugged into a nearby electrical outlet and using wireless charging coils to recharge the rechargeable batteries of the plurality of ultraviolet lights.

The plurality of ultraviolet lights and their individual rechargeable batteries may be nano scaled and woven into the fabric of the wearable apparel. The social distancing application 103 is configured to include transmission of a signal to the wearable apparel to activate the plurality of ultraviolet lights when another person comes within a 6 ft. distance of the user 100. The projected ultraviolet light of the plurality of ultraviolet lights will kill air borne viruses and other pathogens. Once the other person moves away from the user 100 the social distancing application 103 will transmit a signal to the plurality of ultraviolet lights to turn off of one embodiment.

In another embodiment nano particles of copper metal can be embedded into the wearable apparel to add an additional level of protection and kill for example Coronavirus coming in contact with the wearable apparel and prevent the user from contaminating other surfaces and body areas with viruses that would cling to a piece apparel without protective devices. In one embodiment the 6 ft. social distance protective zone can be adjusted to for example 13 ft. as the virus can be expelled in aerosols up to 13 feet.

Data is showing the virus is tracked on shoes and may be a way the virus is spreading. In one embodiment a clean liquid is used to spray nano particles of copper metal onto the soles of shoes and other exposed shoe surfaces. This would kill the viruses on contact. In another embodiment a shoe mat is configured with the nano particles of copper metal sprayed onto both sides and edges of the shoe mat. The user places a shot mat on the floors of their vehicles to kill viruses and prevent them from contaminating the vehicle. The user also sprays the seats and exposed surfaces of the vehicle interior with the nano particles of copper metal spray. The user places a nano particle copper metal sprayed shoe mat at the exterior entries to their home and offices for and at the interior floor next to the exterior entries for removing their shoes and placing them on the interior shoe mat of one embodiment.

In another embodiment the social distancing application 103 is configured to track and store the user's movements and of person's cell phones IP addresses within and at the 6 ft. social distance as adjusted by health departments. This information is used to determine if the user is in contact with the same individuals repeatedly it may indicate these are persons in their family. The information is used to determine if the user is in contact with different people repeatedly it may indicate they may be violating stay at home restrictions.

Should the user test positive for an infection for example Coronavirus the medical personal performing the test and treating the user can download the tracked and stored IP address information for identifying the persons that had come in contact with the infected user to notify them that they need to be tested and to limit their contact with others. The cell phone IP address contact tracing is used to gather the name and contact information for notifying and testing those in contact with the infected user.

The crisis enforcement agency can review the tracked and stored information from the infected user's social distancing application 103 to determine if the user was repeatedly violating the social distancing restrictions perhaps intentionally and take appropriate action. The enforcement agency will also check the locations visited by the infected user. The locations check is to determine any correlation of the spread of infection in those locations with the frequency and numbers of persons contacted by the infected user. If a statistically high correlation exists should the infected user recover they may be charged with spreading the infection and fined and ordered to a house arrest with a GPS ankle monitor of one embodiment.

Figure 2:
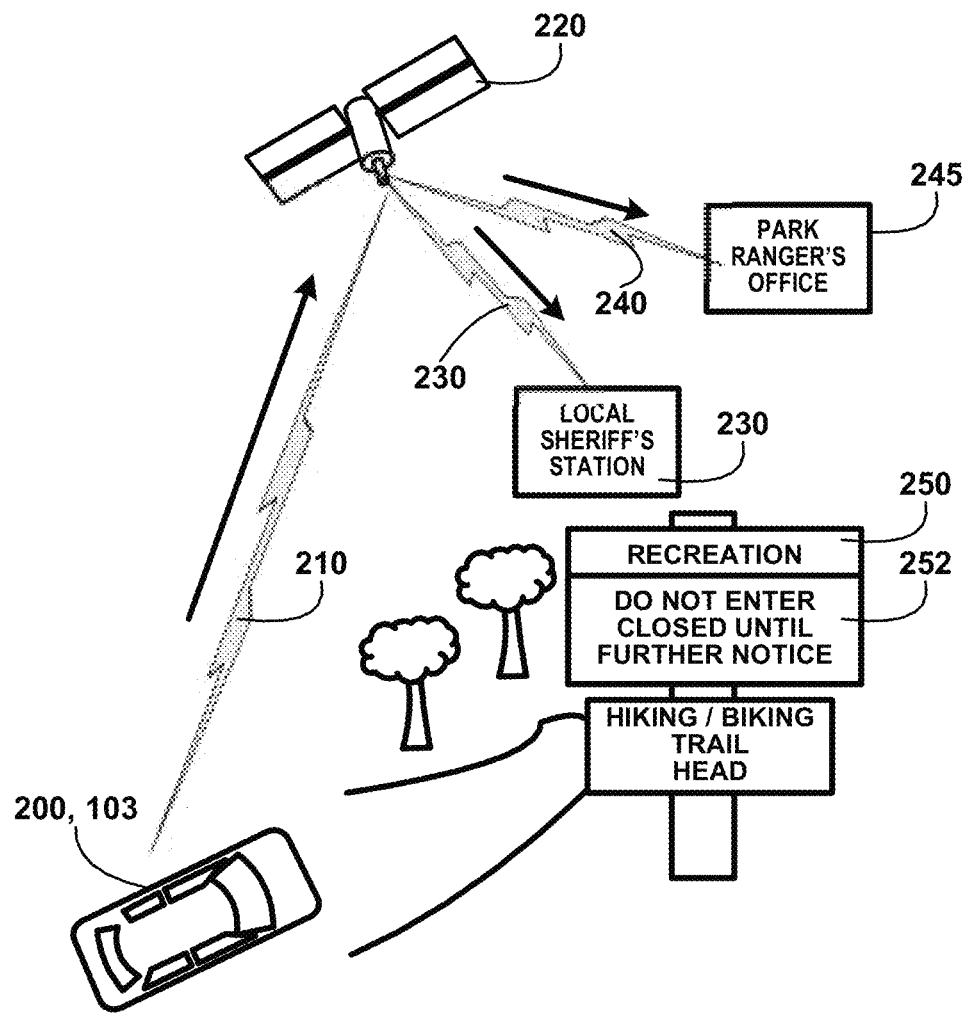
FIG. 2 shows for illustrative purposes only an example of signaling alerts to others including enforcement agencies that the user is entering a restricted area of one embodiment.

Signaling Alerts to Others Include Enforcement Agencies that the User is Entering a Restricted Area:

FIG. 2 shows for illustrative purposes only an example of signaling alerts to others including enforcement agencies that the user is entering a restricted area of one embodiment. FIG. 2 shows another user driving that user's car 200 into a recreational park 250 for hiking and biking trail 260 use. The another user is ignoring the sign which clearly notifies any one approaching that the park is closed until further notice and do not enter 252. Disregarding the notice is more than a violation of law but also puts other persons they come in contact with in danger of becoming infected with a virus or other contagion. Cooperating with authorities, obeying laws and the morale responsibility of protecting each other from needless and reckless behavior during a crisis, be it a contagion or natural disaster carries accountability of individuals who choose to act contrary to reasonable orders for any given situation.

The social distancing application 103 is configured for automatically updating the location and GPS coordinates of restricted facilities. In this example the social distancing application 103 using another user's cell phone GPS coordinates determines another user has entered into a restricted area. The social distancing application 103 is configured for storing contact information for law enforcement and other appropriate agencies with the responsibility of policing the restrictions on identified areas.

The social distancing application 103 automatically sends a text message and email 230 to the contact information of the local sheriff's station 235 and a text message and email 240 to the park ranger's office 245 via satellite 220 connectivity features of the social distancing application 103. The text message and email 235 and 245 contains the identification of the another user from the information on another user's cell phone. The authorities can then proceed to take what deem to be the appropriate actions to alleviate the potential threat to others of one embodiment.

The social distancing application 103 is also used to report the another user to enforcement agencies, as requested by officials, people not wearing mask, opening non-essential business, encouraging and forming assemblies of large groups of people and other violations of an officially declared crisis. The user 100 social distancing application 103 will include contact information for reporting people showing symptoms for example running a fever, coughing and other symptoms of an infection for example Covid-19, Influenza and other infectious diseases.

The social distancing application 103 will gather current information on hot spots where infection rates are high to inform the all users to stay away from those hot spots. The social distancing application 103 will assist all users with self-reporting of users inputting for example crowded stores to avoid, where to find supplies in short supply including for example toilet paper, bottled water, disinfectants, hand sanitizer, eggs, and other items difficult to find. One user may need the assistance in picking up those same supplies and a user 100 can volunteer to purchase the needed supplies for the other user and get reimbursed upon their non-contact delivery.

The crowd based participation in using the social distancing application 103 will allow every user to better comply with official regulations and orders, keep each other informed of dangerous locations, reporting others that ignore the regulations and orders and put everyone at greater risk, and assist each other in getting supplies to be able to maintain lock-downs and self-isolating and self-quarantining of one embodiment.

A Facial Mask Coupled to a User's Cell Phone Configured to Initiate Protection Devices:

FIG. 3A shows for illustrative purposes only an example of a facial mask wirelessly coupled to a user's cell phone configured to initiate protection devices part 1 of one embodiment. FIG. 3A shows a protective mask 300 worn by a user 100 to protect the wearer from other persons infecting the user 100 with their coughs, sneezes and other nasal and oral discharges possibly containing air borne viruses and bacteria. The nose bridge 310 is normally a metal rod or band that the user 100 can bend to better conform to the shape of the nose. The protective mask 300 is configured to have a nose bridge 310 with a container conforming to a hollow elongated cavity 330 made with a flexible plastic for holding a liquid anti-microbial disinfectant.

The liquid anti-microbial disinfectant includes hypochlorous acid. Hypochlorous acid is the substance your white blood cells produce to fight off infections. Hypochlorous acid is FDA approved, safe, non-irritant with no harmful chemicals, fumes or residues. Hypochlorous acid is made with three ingredients: salt, water and vinegar and is processed with electrolysis.

The fabric is configured with downward oriented folds 320 to direct air flow from at least one micro fan position on the interior of the protective mask 300. The at least one micro fan positioned on the interior of the protective mask creates a positive pressure to prevent outside air from entering the at least one protective mask. The fabric also includes an antimicrobial coating on the inside and outside surfaces of the fabric, casing edging and straps and elastic bands of the protective mask 300 of one embodiment.

The protective mask 300 is configured with flexible rechargeable batteries that can be recharged using a wireless charging platform. The protective mask 300 is configured to include biological sensors to detect viruses and bacteria and alert the user. The protective mask 300 is configured to include user 100 tracking of leaving their home and to what destination they travel to for determining whether those destinations are essential or not.

The protective mask 300 is configured to include internet, WIFI, and satellite connectivity to maintain a digital electronic coupling with the social distancing application 103 installed on the user's cell phone 102. The protective mask 300 will transmit from a digital transceiver a signal to the social distancing application 103 when the user 100 is wearing the protective mask 300. The protective mask 300 is configured with temperature sensors to detect if the user 100 is running a fever, an air flow sensor to detect when the user 100 is coughing and if the user 100 is having any trouble breathing, a humidity senor to detect the moisture content of the user's respiration to detect dry mouth conditions, and a heart rate sensor to detect the user's pulse and coronary vital signs. In one embodiment the protective mask 300 is configured with for example a Coronavirus testing sensor to detect if the user 100 is infected and alerting the user 100 of the infection and suggesting they immediately contact their doctor. The protective mask 300 is configured to include at least one digital camera.

The protective mask 300 is configured to include at least one digital processor and at least one memory device. The protective mask 300 is configured to transmit and store all photos, videos and audible sounds including voices on a cloud storage system. In the event the protective mask 300 is lost or stolen the user can recover the stored data from the cloud onto a personal computer or replacement protective mask 300.

The protective mask 300 is configured to include features and devices for facial recognition and detect biometric characteristic of a person and their movements. For example the facial recognition can determine whether the person is known to the user from images of friends, family members and business associates to alert the user that the particular person is approaching and to offer a greeting. In another example the facial recognition is used to assess the emotional state of the nearby person. For example do they have a worried look, a happy expression, do they appear angry, does there expression reflect a threat to the user. In an example determine if the detected biometric characteristic of a person and their movements indicate they are running towards the user, casually walking past the user and do their movements indicate a threat to the user. The protective mask 300 is configured to operate free of connected wire to another device other than the pair of glasses 510.

The protective mask 300 is configured to assist the user with communications, apps and learning about various issues including any crisis and the details that may be affecting the user. The protective mask 300 is configured for incorporating artificial intelligence, augmented reality, mixed reality and other features available for adjusting to changes in their daily routine that may be imposed for dealing with a crisis or just normal everyday life. The protective mask 300 is configured to include voice recognition. Voice recognition is used for identifying the user and unlocking the function of the protective mask 300. Voice recognition is used for identifying other persons near the user.

In one embodiment nano particles of copper metal are embedded into the protective mask 300 fabric. Copper is shown to kill Coronavirus. The embedded nano particles of copper metal increase the level of protection to the user wearing the protective mask 300.

FIG. 3B shows for illustrative purposes only an example of a facial mask wirelessly coupled to a user's cell phone configured to initiate protection devices part 2 of one embodiment. FIG. 3B shows a user 100 wearing the protective mask 300. A measured amount of the liquid anti-microbial disinfectant is sprayed outward 362 as a vapor 364 using at least one nozzle 360 to coat the front of the mask when the social distancing application 103 determines the user 100 is being approached by another person within the 6 ft. social distancing perimeter of one embodiment.

FIG. 3C shows for illustrative purposes only an example of a facial mask wirelessly coupled to a user's cell phone configured to initiate protection devices part 3 of one embodiment. FIG. 3C shows a cross section of the front 370 and rear 375 of the protective mask 300 including the hollow elongated cavity 330 and downward oriented folds 320. Also shown in FIG. 3C are a plurality of ultraviolet (UV) led lights 380 coupled on the interior of the protective mask 300 and oriented toward the front of the protective mask 300 to illuminate the fabric for killing any virus or bacteria entering from the outside of the protective mask 300.

The protective mask 300 is configured to include at least one micro fan 390 for creating a positive air pressure within the interior of the protective mask 300 for preventing air borne viruses and bacteria from infiltrating the barrier created by the protective mask 300. The downward oriented folds 320 direct the air flow downward 392 on the exterior of the protective mask 300 to prevent blowing any air borne viruses and bacteria outward to another person of one embodiment.

In one embodiment the at least one micro fan 390 is configured to include a heating element to increase the temperature of the air inside the protective mask. Studies have been reported for example that Coronavirus live longer in cold conditions and hot conditions kills the Coronavirus much faster than cold conditions. The at least one micro fan 390 heated air will reduce the time the Coronavirus lives.

Additionally the social distancing application 103 gathers the ambient temperature at the user's location. The social distancing application 103 calculates a temperature setting for the at least one micro fan 390 heaters that will create a temperature gradient that will through heat transfer with the protective mask 300 fabric create a heated air barrier that will assist in killing the viruses and create an updraft with the rising hot air to direct the airborne viruses away from the user. Also the air pressure created by the at least one micro fan 390 inside the protective mask 300 will pass through the protective mask 300 fabric forcing the ambient air carrying any viruses further away from the user adding to an increase in the protection provided the user of one embodiment.

Figure 4:
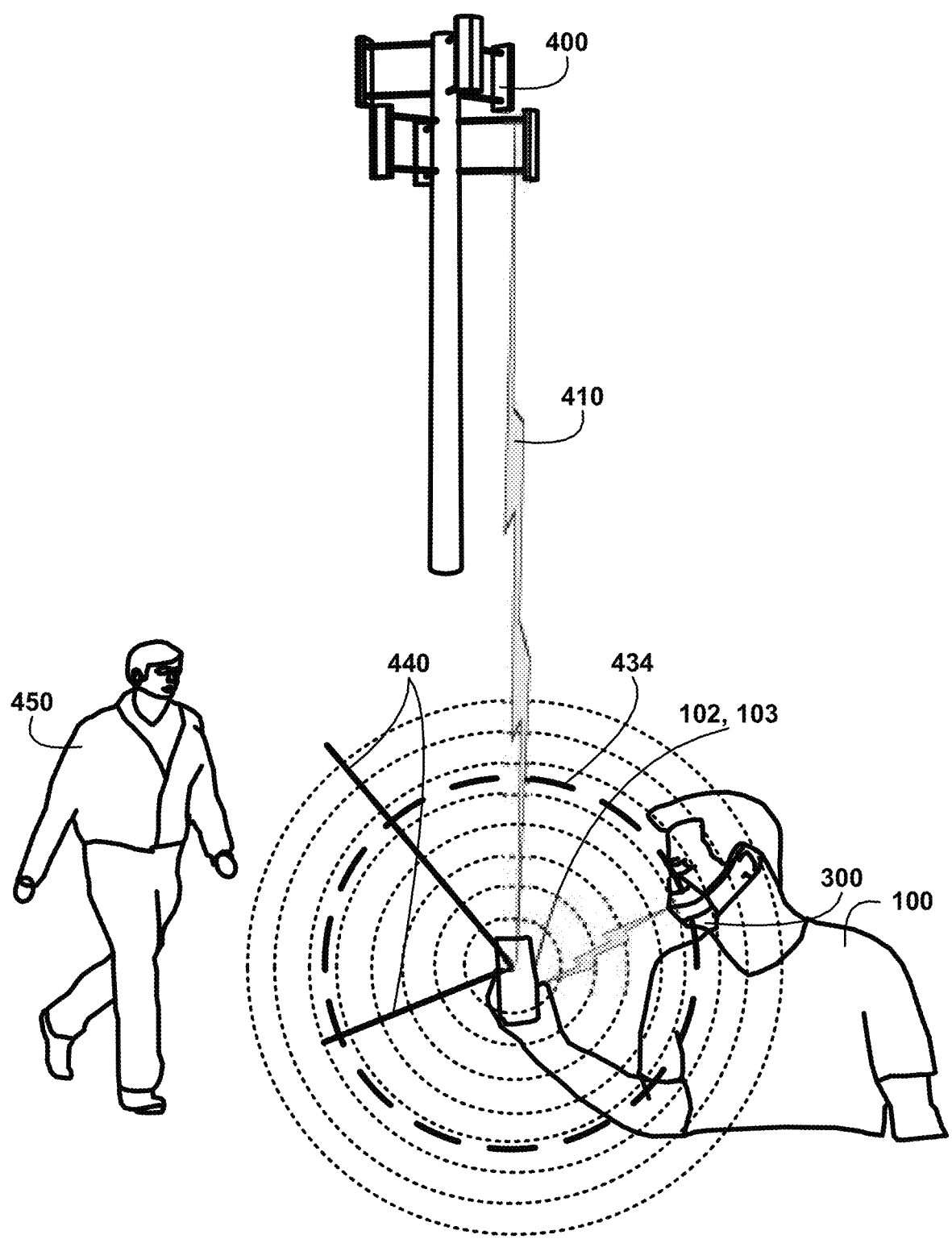
FIG. 4 shows for illustrative purposes only an example of a facial mask wirelessly coupled to a user's cell phone configured to initiate protection devices part 4 of one embodiment.

FIG. 4 shows for illustrative purposes only an example of a facial mask wirelessly coupled to a user's cell phone configured to initiate protection devices part 4 of one embodiment. FIG. 4 shows a cell tower 400 transmitting a GPS signal 405 to a user's cell phone 102. A user 100 is wearing the protective mask 300. Showing is the user's 6 ft. social distancing perimeter 434 and the transmitting and receiving signals 436 of the user's cell phone 102. The social distancing application 103 using the user's cell phone camera field of view 440 analyzes an image of the person approaching the user 100 for determining if that person is wearing a mask.

A person not wearing a mask 450 is approaching the user. The social distancing application 103 transmits an email and text message including the user's location using the GPS coordinates received by the user's cell phone 102, date and time, contain the identification of the user 100 from the information on the user's cell phone. Also included in the email and text message is the identification of the approaching person from the information on the approaching person's cell phone if available and sending the image captured using the user's cell phone camera of the approaching person not wearing a mask to the appropriate local enforcement agency to report the non-compliance with the publicly announce orders to wear a mask in public.

The user's cell phone upon determining the approaching person is still getting closer to the user 100 transmits an alert signal 430 to the protective mask 300 to initiate the protection devices operations of one embodiment. The social distancing application 103 activates physical interventions and not just alert info about social distancing or avoidance violations. The social distancing application 103 using a user's cell phone 102 sets forth in motion an activation of a wearable device (fan mask system, collar of fans, crown of fans, breast plate back plate of fans for example) which initiates a curtain of protection around the face, eyes, nose, mouth and ears. The curtain of protection is an expulsive force for example including subsonic airwaves, ultrasound, laser, a disinfectant counterbalanced aerosol vapor, and UV light.

Iterations can include a wearable fan pushing—expelling a protective circle of force against an aerosolized biological or chemical injurious cloud of vapor that comes within or breaks the specified boundaries set by the application, currently 6 Ft but may vary depending on a type of potentially injurious cloud, vapor and entity.

The user's cell phone 102 with the social distancing application 103 can receive and transmit signals from a user's wearable devices. For example a user may be dressed in clothing that includes wearable sensors for detecting pulse, heartbeat, body temperature, respiration, bodily movements sitting, walking, and running, and body positions including standing, bending, prone, and sitting. The social distancing application 103 can analyze the user's physical condition. Should the user's physical condition analysis indicate for example signs of COVID-19 the social distancing application 103 can automatically transmit alerts to friends, family, 911, emergency services to assist the user should the indications include a lack of movement, difficulty breathing, a falling change of body position. The emergency alert can automatically include the user's cell phone 102 GPS location and vital signs. The drone is configured to automatically launch upon receipt of an emergency signal to retransmit the emergency signal to a strong cellular signal strength.

Figure 5:
FIG. 5 shows for illustrative purposes only an example of a pair of glasses wirelessly coupled to a user's cell phone configured to initiate protection devices of one embodiment.

Pair of Glasses:

FIG. 5 shows for illustrative purposes only an example of a pair of glasses wirelessly coupled to a user's cell phone configured to initiate protection devices of one embodiment. FIG. 5 shows a user 100 wearing a pair of glasses 510 in one embodiment coupled to the protective mask 300 with the downward oriented folds 320. In another embodiment the protective mask 300 is wirelessly coupled to the pair of glasses 510. In yet another embodiment the pair of glasses 510 may be worn by a user without wearing the protective mask 300.

The coupling of the protective mask 300 and the pair of glasses 510 includes cabling integrated into the mask ties and elastic ear bands. The pair of glasses 510 when receiving an alert from the social distancing application 103 that someone is closing in on the user's position activates a laser light directed to the ground at an approximate 6 ft. distant from the user 100 based on an angle calculated using the user's approximate height from the GPS elevation data of the user 100 and the ground surface. The laser light will project a radial line in front of the user 100 covering approximately 180 degrees of arc. The social distancing application 103 will broadcast using the speaker feature of the cell phone an audible first message to "Please do not violate my space, Thank you".

Should the approaching person not alter their course to maintain the 6 foot social distance the social distancing application 103 will make a second audible broadcast to the approaching person to STOP you are getting too close. Stay away. Thank you. At the instant of the beginning of the second audible message the social distancing application 103 activates at least one bright strobe light coupled to the pair of glasses 510 which is directed towards the user's direction of view to project the strobe light flashing towards the approaching person.

Should the second message and strobe light projections not deter the approaching person the social distancing application 103 will capture an image of the approaching person and transmits an email and text message including the user's location using the GPS coordinates received by the user's cell phone, date and time, contain the identification of the user 100 from the information on the user's cell phone and identification of the approaching person from the information on the approaching person's cell phone if available and sending the image captured using the user's cell phone camera of the approaching person not wearing a mask to the appropriate local enforcement agency to report the non-compliance with the publicly announce orders.

Concurrently the social distancing application 103 will activate at least one directional speaker coupled to the pair of glasses 510 to broadcast an inaudible frequency with changing intensity that may cause the approaching person to begin to feel nauseous and a headache. Concurrently the social distancing application 103 will activate at least one directional speaker coupled to the pair of glasses 510 to broadcast a high pitched screeching sound in the direction of the approaching person. The social distancing application 103 upon activation of the inaudible and audible speaker also activates a digital range finder coupled to the pair of glasses 510. Should the approaching person continue to close in on the user's position the attenuation of the inaudible and audible sounds speaker broadcasts will increase in intensity and the social distancing application 103 will begin increasing the current to the speakers to further increase the intensity of the inaudible and audible sounds speaker broadcasts.

Should the digital range finder measure that the approaching person is at a distance of 3 feet (1 meter), slightly greater than an extended arm's length, from the user 100 and still in motion towards the user 100, the social distancing application 103 transmits a third message containing all the previous information and a notice to the appropriate local enforcement agency to report that the approaching person is present by their action a probable medical threat and physical threat to the user 100 and that the user 100 is in fear for their life and will initiate self-defense measures including a licensed Taser and laser light to the approaching person's eyes.

The social distancing application 103 will activate a Taser gun embedded into the pair of glasses that is aimed by the user 100 at the approaching person using cross hair illuminations switched on in the lenses of the pair of glasses 510. The Taser gun will be fired upon a user 100 verbal command to "FIRE" and received by the user's cell phone and transmitted to the pair of glasses 510 Taser control digital device. Upon receiving the user 100 verbal command to "FIRE" the social distancing application 103 will activate at least one laser light to project at least one laser light in the direction of the approaching person's eyes as determined by an analysis of the approaching person's image that has continuously been recorded as video using the user's cell phone camera of one embodiment.

The pair of glasses 510 is configured with motion detectors and cameras in the frame and ear pieces that are oriented to the rear, left and right side and front of the user 100. When a motion detector detects movement for example behind the user 100 it activates a rear camera. The images detected are projected onto one of the glasses lenses to alert the user 100 of action taking place behind them. The cameras are equipped with range finders and image recognition to display the distance and type of moving object for example a car in one instance and in another instance a person running towards the user 100.

The pair of glasses 510 includes a laser that is configured to determine the air quality in front of the user. A user walking will be alerted to a high concentration of particulates ahead to allow the user to change paths. The pair of glasses 510 includes a near infrared (NIR) spectrometer to detect air borne pathogens in the user's path. The pair of glasses 510 uses at least one from a group of WIFI, internet and satellite connectivity devices to send the chemical compositions to a social distancing network.

The social distancing network uses artificial intelligence devices for performing an analysis of the chemical compositions detected using the NIR spectrometer to determine what, if any, pathogens are suspended in the air in the user's path. Should any air borne pathogens be identified by the artificial intelligence devices analysis an alert is sent to digital ear pieces coupled to the pair of glasses 510 to sound an audible alarm to the user 100. The social distancing network also transmits a visual alert to the pair of glasses for displaying a visual alert on at least one of the lenses of the pair of glasses.

The pair of glasses 510 is configured with rechargeable batteries located in the frame and ear pieces that can be recharged using a wireless charging platform. The pair of glasses 510 is configured to create an augmented reality (AR) view in the lenses of the pair of glasses. The user can move to rotate in 360 degrees to capture the real life environment surrounding them. The AR will show the real life environment and super impose the user's 6 ft. perimeter social distance. This will aid the user in maintaining the appropriate social distance from others and evaluate others positions relative to the user 100.

The pair of glasses 510 is configured to include at least one digital processor and at least one memory device. The pair of glasses 510 is configured to transmit and store all photos, videos and audible sounds including voices on a cloud storage system. In the event the pair of glasses 510 is lost or stolen the user can recover the stored data from the cloud onto a personal computer or replacement pair of glasses 510.

The pair of glasses 510 is configured to include features and devices for facial recognition and detect biometric characteristic of a person and their movements. For example the facial recognition can determine whether the person is known to the user from images of friends, family members and business associates to alert the user that the particular person is approaching and to offer a greeting. In another example the facial recognition is used to assess the emotional state of the nearby person. For example do they have a worried look, a happy expression, do they appear angry, does there expression reflect a threat to the user. Determine if the detected biometric characteristics of a person and their movements indicate they are running towards the user, casually walking past the user and are their movements indicating a threat to the user.

The pair of glasses 510 is configured to operate without connected wires to another device other than the protective mask 300. The pair of glasses 510 is configured to assist the user with communications, apps and learning about various issues including any crisis and the details that may be affecting the user. The pair of glasses 510 is configured for incorporating artificial intelligence, augmented reality, mixed reality and other features available for adjusting to changes in their daily routine that may be imposed for dealing with a crisis or just normal everyday life. The pair of glasses 510 is configured to include voice recognition. Voice recognition is used for identifying the user and unlocking the function of the pair of glasses 510. Voice recognition is used for identifying other persons near the user.

Figure 6:
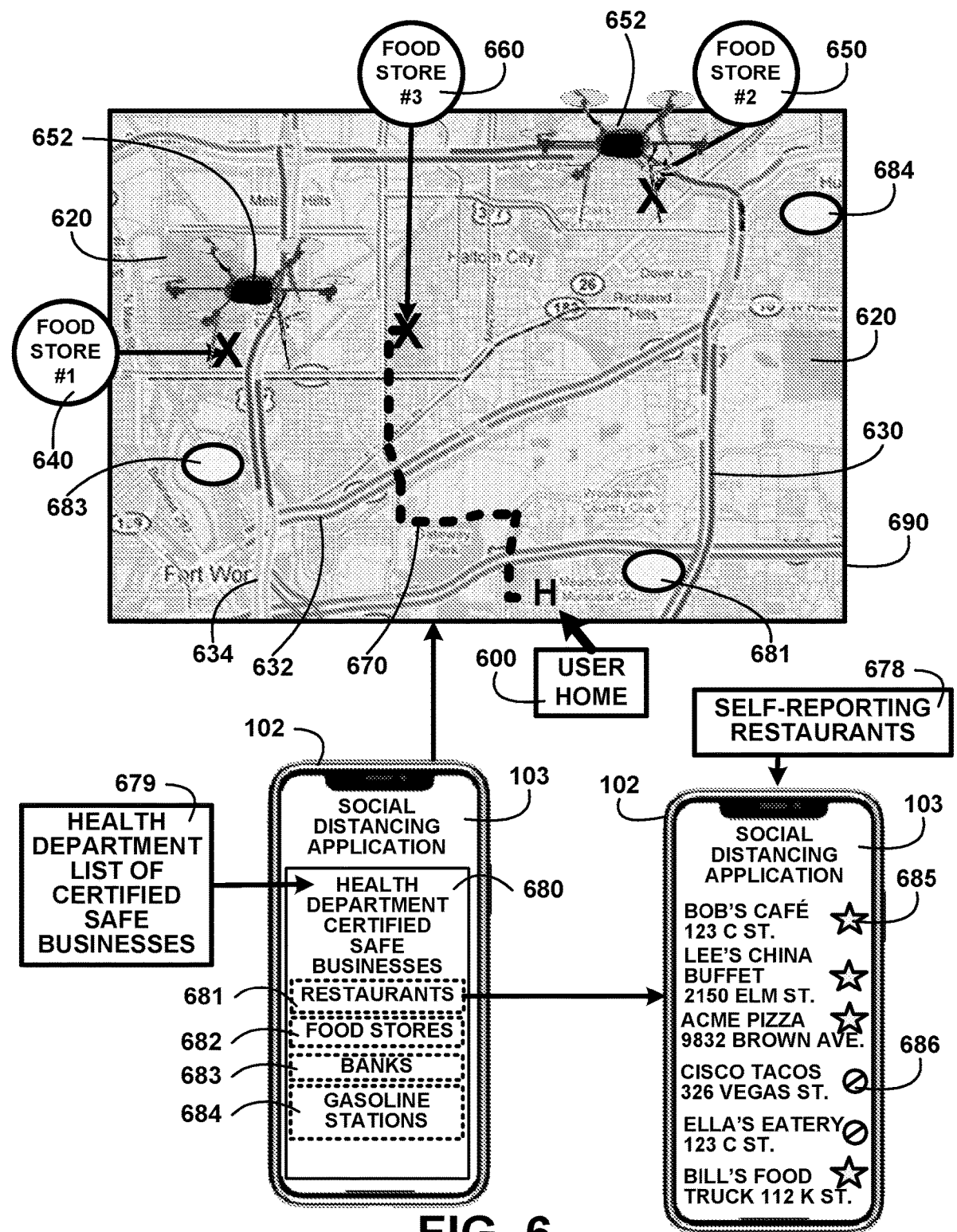
FIG. 6 shows for illustrative purposes only an example of displaying a local area map showing hot spots and preferred travel routes and least congested food store locations of one embodiment.

Hot Spot Mapping:

FIG. 6 shows for illustrative purposes only an example of displaying a local area map showing hot spots and preferred travel routes and least congested food store locations of one embodiment. FIG. 6 shows a local map displayed on the user's cell phone 102 with the social distancing application 103. The local map 690 indicates red shaded hot spots based on health department current reports of the highest numbers of infected people in those areas.

The local map 690 displayed also displays live traffic reported for the local roads in the user's area. The local map 690 displayed also displays the local food stores in the user's area. Information from the live traffic and self-reporting from other users is used to calculate the probable least congested food store for the user 100 of FIG. 1 to shop for food. Food store #1 640 is close to a hot spot, has heavy traffic 630 and moderately heavy traffic 634 and has been reported to have long lines. Food store #2 650 has heavy traffic 630 and has been reported to have a full parking lot by other users. Food store #3 660 has light traffic 632 and has been reported to have few shoppers by other users. The social distancing application 103 determines a preferred route 670 for the user 100 of FIG. 1 to travel to food store #3 660 from the user home 600 of one embodiment.

Crowd based self-reporting also includes users with an aerial drone 652 for a fly over of for example food stores to determine how full the parking lot is with cars. This will provide raw data to other users to get some idea of how crowded the food store may be at that time. The raw data includes digital camera images in this example of a food store parking lot. The drone is equipped a visual light camera for daytime fly overs and an infrared camera for night time fly overs. At least one camera is provided for capturing images and videos of the area features and conditions below the drone and surrounding area during user directed reconnaissance. Captured images and videos are displayed on the user digital device with the social distancing application.

The drone is equipped with a strobe light to allow the user to see the drone's location during nighttime flyovers and send S.O.S. signals to the user when crowds are excessive to alert the user to avoid the location. The drone can automatically transmit an emergency alert to friends and family members, even 911 and emergency services should the user be at high a risk of physical harm due to overcrowding, becoming stranded in a hot spot and other situations.

The drone includes solar cell panels for recharging batteries while in flight and the solar cell panels can be oriented to get solar exposure when attached to a user backpack when being transported to a fly over location. The raw data is processed using a digital processor coupled to the drone for formatting and analysis of the data prior to transmission to other users using a cellular communication device installed on the drone 652 including to the user's digital device for example a smart phone. The user can send a message to the drone for transmission to other users for example to describe the fly over location wherein the user's smart phone GPS coordinates are automatically included in the transmitted message. The drone cellular communication device can reach more distant cell towers while in flight then the user's smart phone at ground level with buildings and other potential obstacles. The drone includes a cellular signal strength sensor to automatically move to a location to boost cellular signal strength. Another example for a fly over can be a beach or other non-vehicular observation to allow the user and other users to view remote locations they may for example be walking to in order to observe numbers of persons and open areas available for a beach social distanced site to set up.

The health department list of certified safe businesses 679 verifies that they have determined the businesses to be sanitized, following prescribed social distancing and using appropriate measures and personal protection equipment to be certified as SAFE. The health department transmits and updates the safe list to user's cell phone 102 with the social distancing application 103. The social distancing application 103 saves the list of health department certified safe businesses 680. The health department list includes for example restaurants 681, food stores 682, banks 683, and gasoline stations 684. The social distancing application 103 displays the listed businesses on the local map 690.

A user 100 of FIG. 1 presses the restaurants 681 button on the list and the social distancing application 103 displays the names and addresses of self-reporting restaurants 678. The social distancing application 103 performs a confirmation check to verify against the list of health department certified safe businesses 680. The social distancing application 103 displays a star 685 if the verification is positive. The social distancing application 103 displays a don't-go symbol 686 if the verification is negative of one embodiment.

Figure 7:
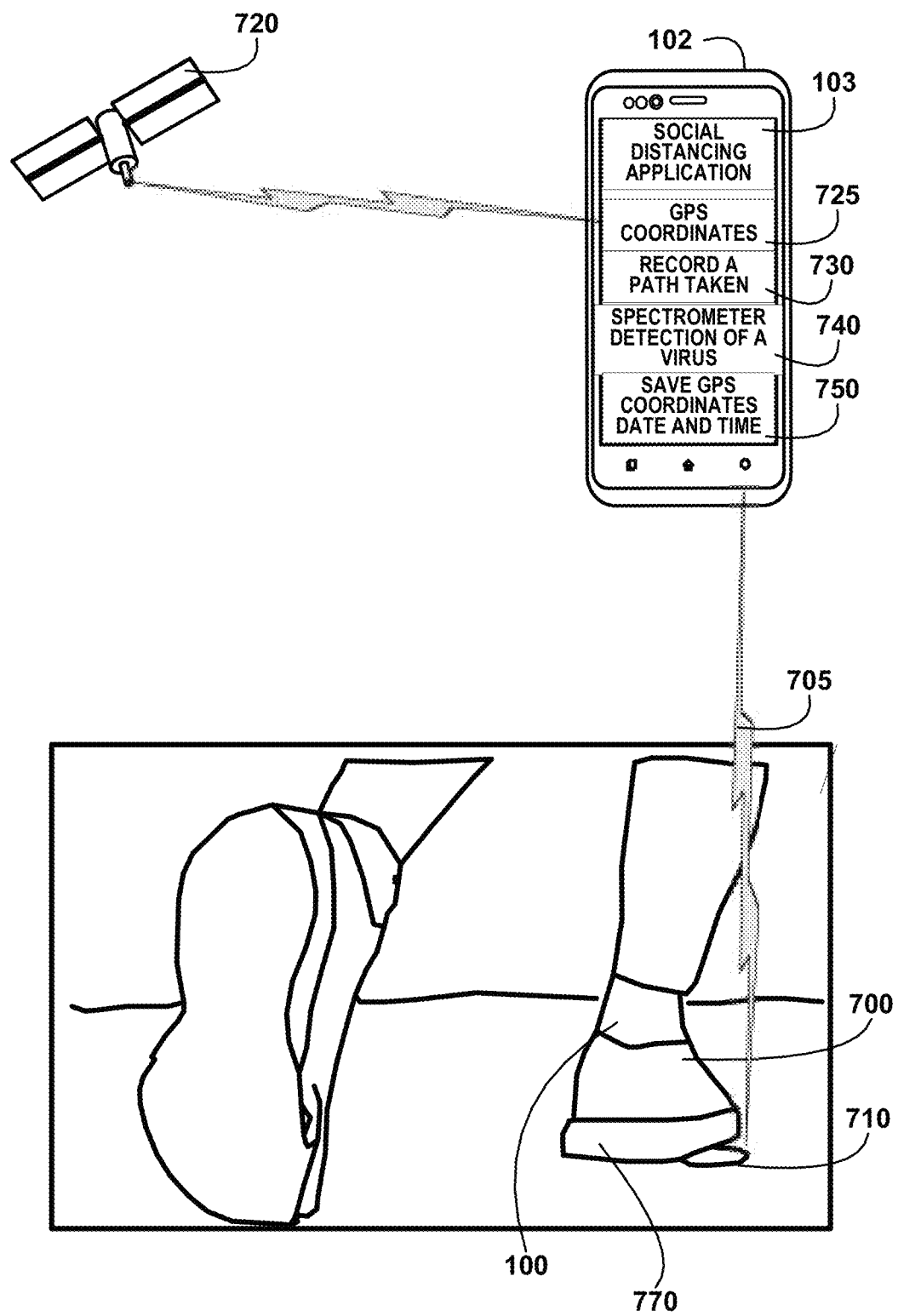
FIG. 7 shows for illustrative purposes only an example of a user recording walking path taken of one embodiment.

User Recording Walking Path Taken:

FIG. 7 shows for illustrative purposes only an example of a user recording walking path taken of one embodiment. FIG. 7 shows the user 100 wearing shoes 770 with a spectrometer 700 coupled to the shoes 770 and performing near infrared scans of the walking surface 710. The spectrometer 700 gathers the chemical characteristics of any components on the walking surface and transmits 705 that data to the user's cell phone 102 with the social distancing application 103.

The social distancing application 103 uses the cell phone digital memory devices to store the chemical characteristics of known viruses and bacteria. The social distancing application 103 performs an analysis to determine if any of the chemical characteristics match a known pathogen including viruses and bacteria. The social distancing application 103 records GPS coordinates 725 received from a satellite 720 to record a path taken by the user 100 while walking. Should the social distancing application 103 analyses determine for example a virus is identified from the spectrometer 700 data gathered the social distancing application 103 will save GPS coordinates, date and time 750 of the spectrometer detection of a virus 740 transmittal of one embodiment.

Figure 8:
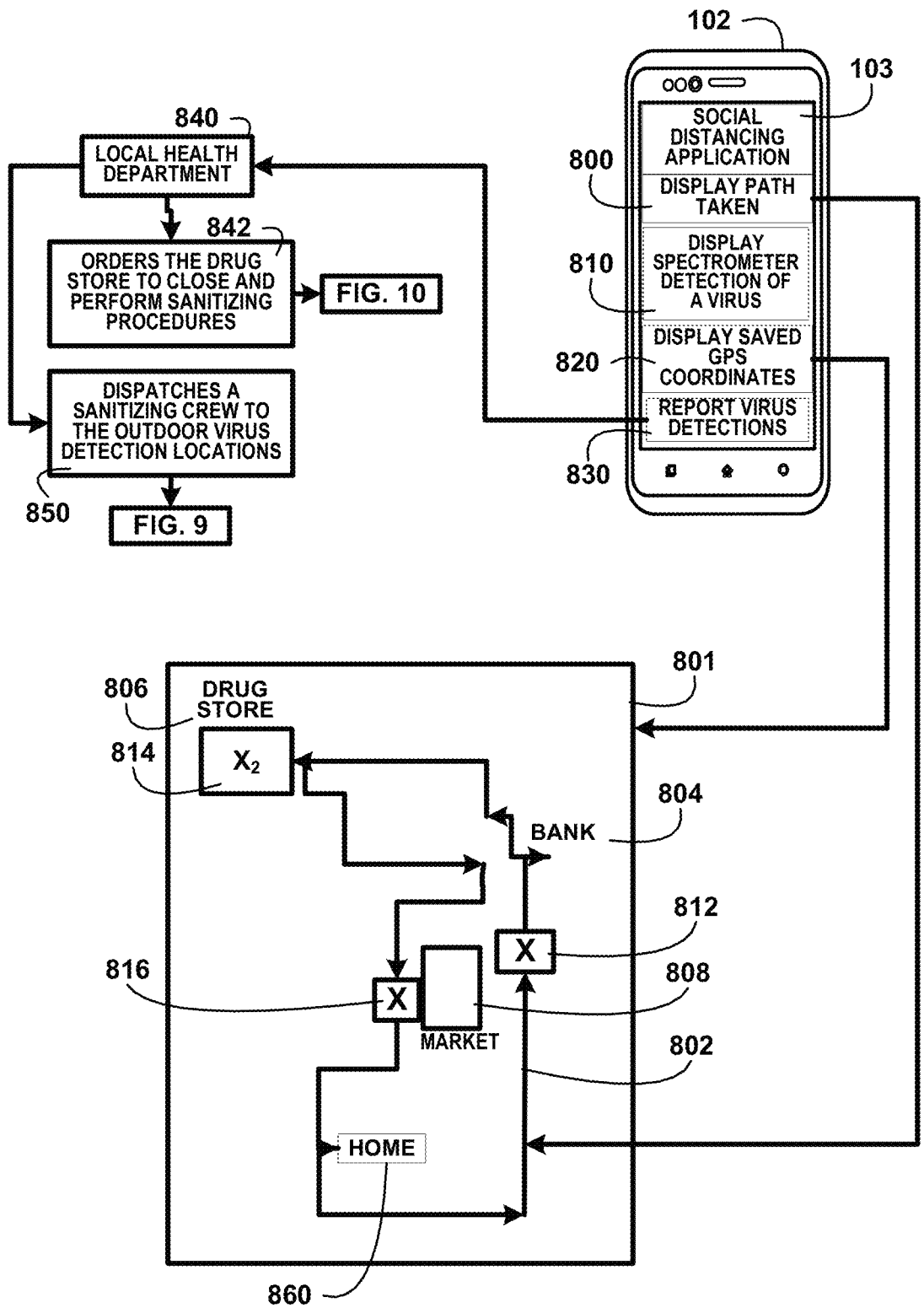
FIG. 8 shows for illustrative purposes only an example of reporting virus detection locations of one embodiment.

Reporting Virus Detection Locations:

FIG. 8 shows for illustrative purposes only an example of reporting virus detection locations of one embodiment. FIG. 8 shows the user 100 of FIG. 1 after returning home 860 and checking her user's cell phone 102 and using the social distancing application 103 to display path taken 800 during the walk. The path taken 802 is displayed on a map 801 using the recorded GPS coordinate based path walked by the user. The map 801 indicates the type of office and stores on the map that the user visited. The social distancing application 103 shows a bank 804, drug store 806 and market 808 visited by the user 100 of FIG. 1.

The social distancing application 103 also using the saved data performs a process to display spectrometer detection of a virus 810 on the map 801 using the display saved GPS coordinates shown with $X_1$ 812, $X_2$ 814 and $X_3$ 816. The social distancing application 103 then transmits the virus detections saved GPS coordinates, date and time to report virus detections 830 to a local health department 840. Upon receipt of the virus detections the local health department 840 orders the drug store to close and perform sanitizing procedures 842 as shown in FIG. 10. The local health department 840 also dispatches a sanitizing crew to the outdoor virus detection locations 850 as shown in FIG. 9 of one embodiment.

Figure 9:
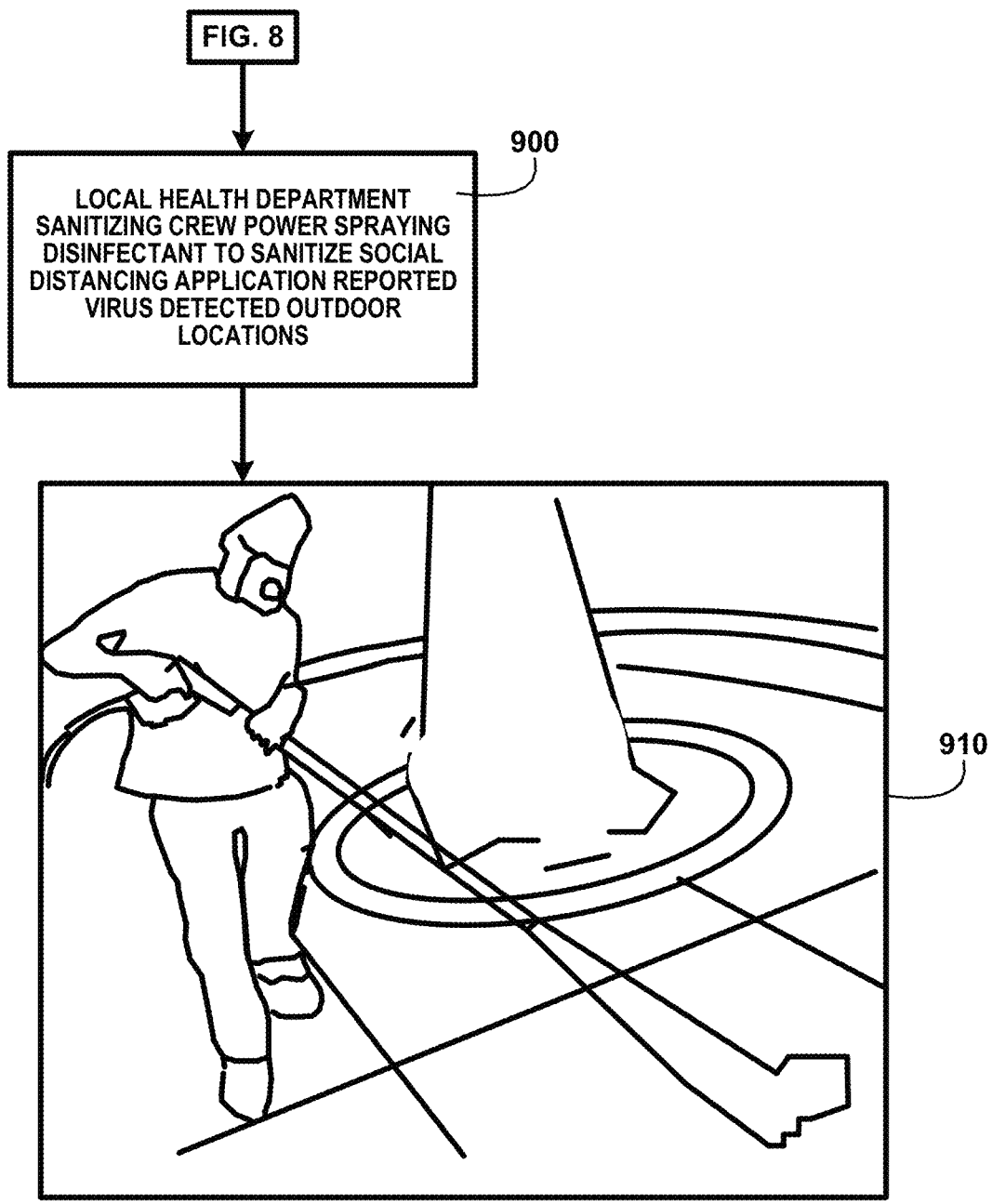
FIG. 9 shows for illustrative purposes only an example of a local health department sanitizing crew of one embodiment.
Figure 10:
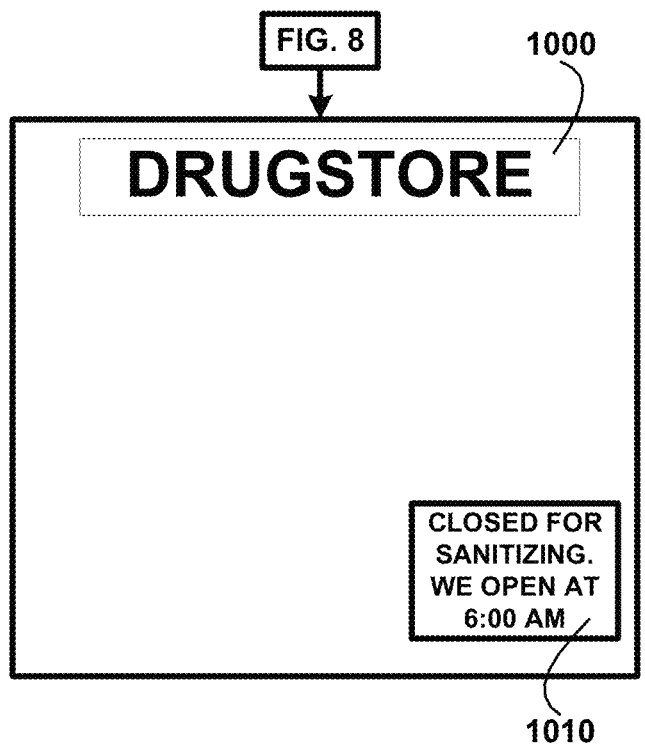
FIG. 10 shows for illustrative purposes only an example of a drug store closed for sanitizing of one embodiment.
Figure 11:
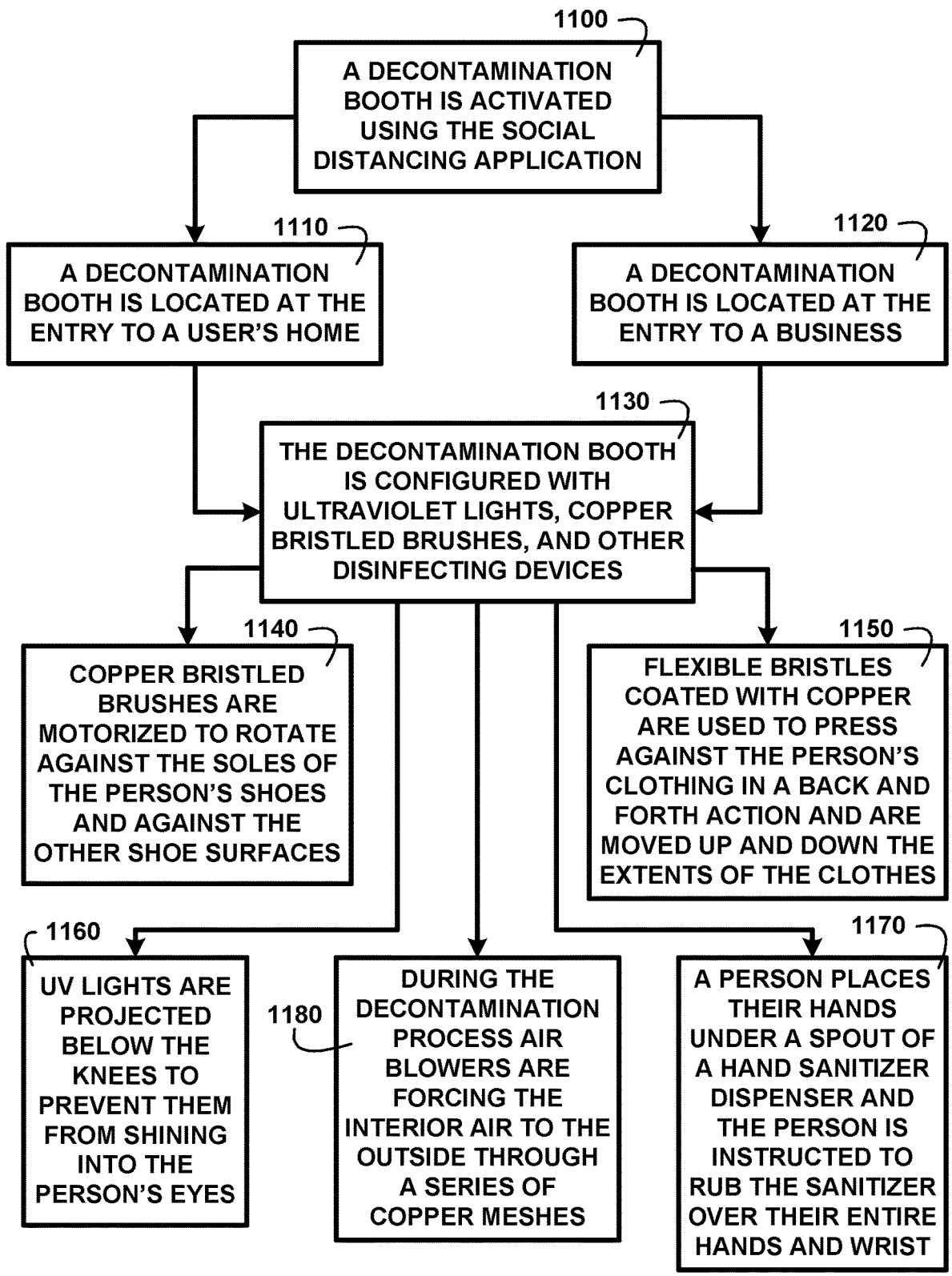
FIG. 11 shows for illustrative purposes only an example of a decontamination booth of one embodiment.
Figure 12:
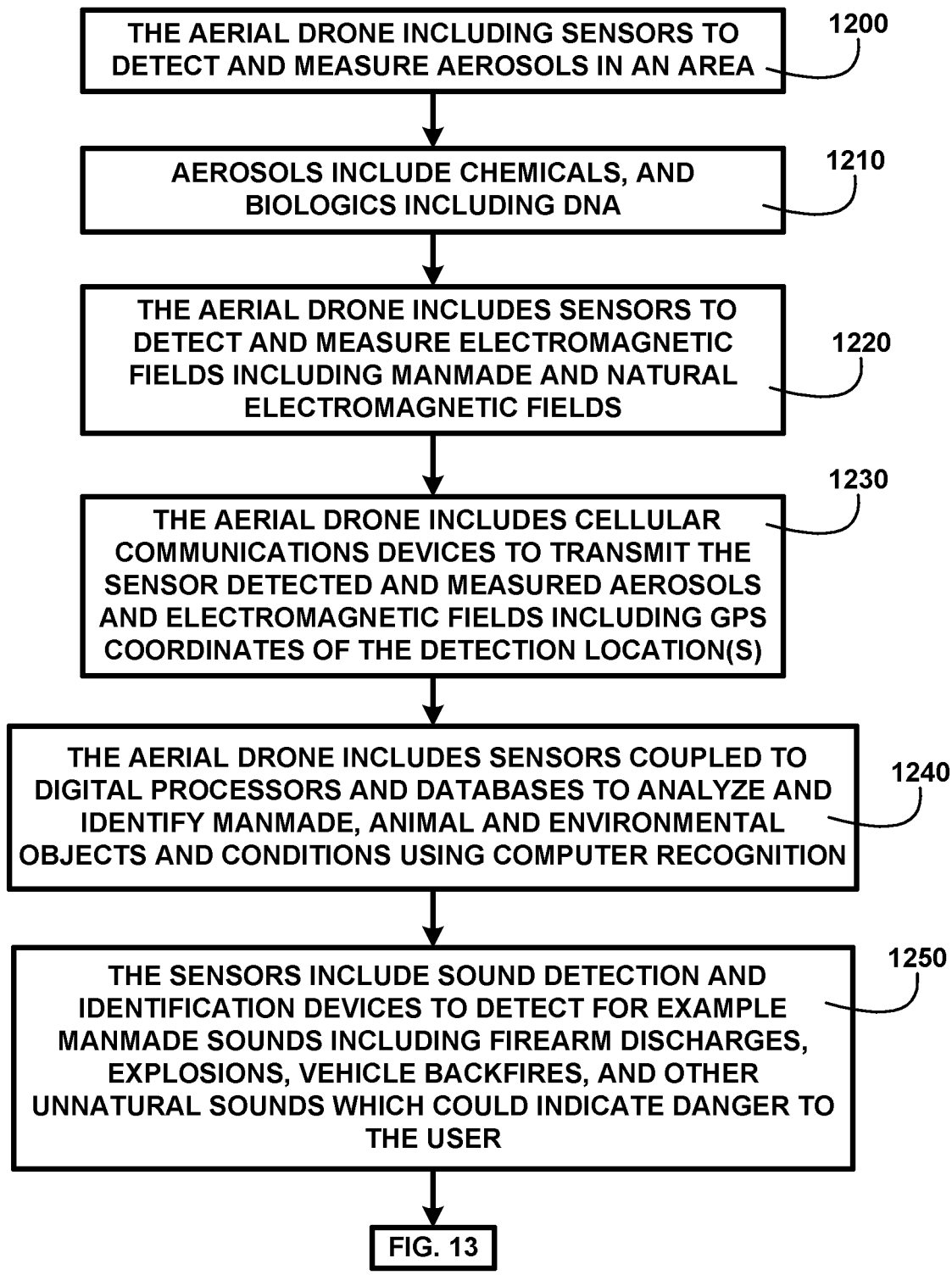
FIG. 12 shows a block diagram of an overview of drone aerosol sensors of one embodiment.
Figure 13:
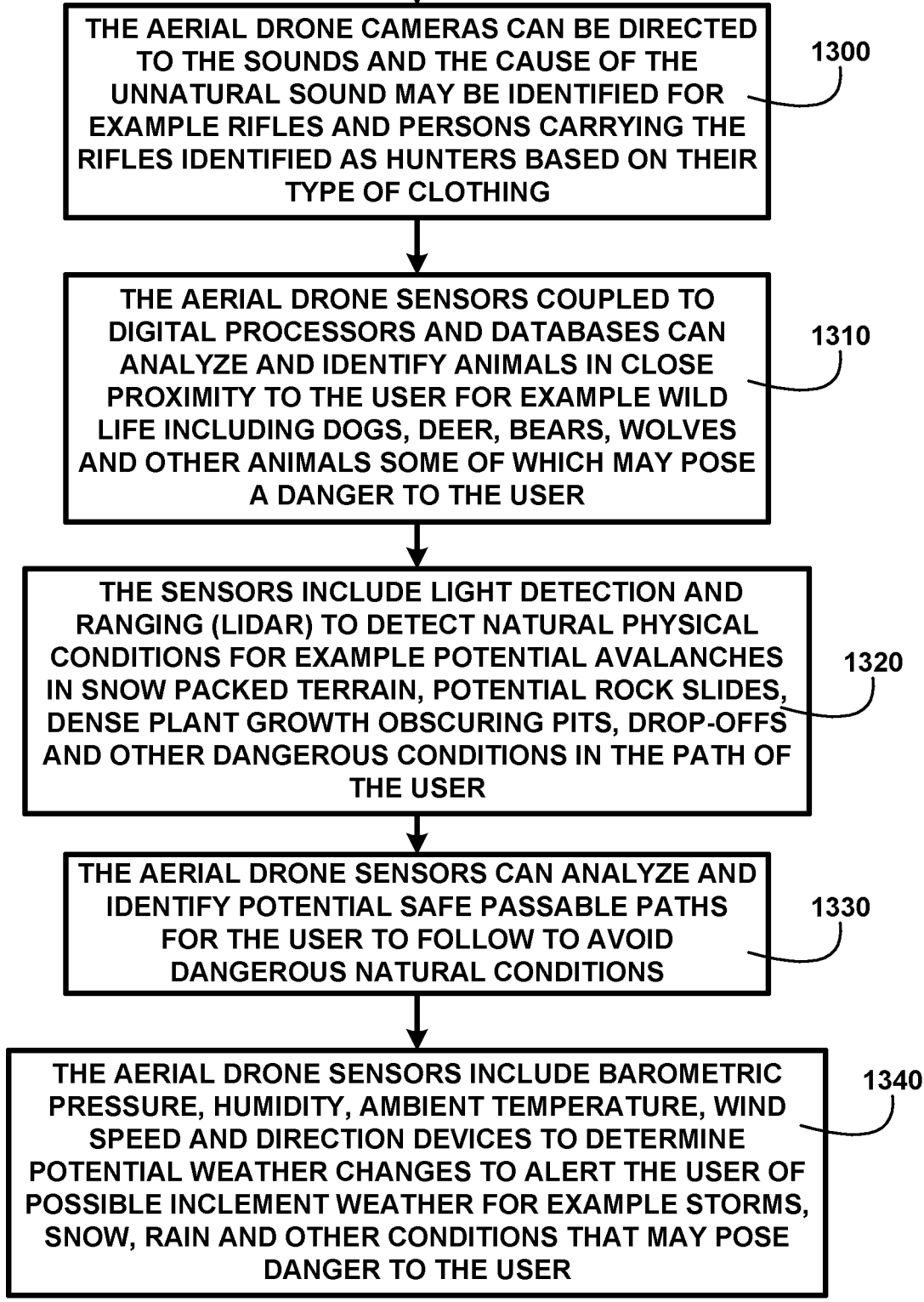
FIG. 13 shows a block diagram of an overview of drone digital processors and databases of one embodiment.

Local Health Department Sanitizing Crew:

FIG. 9 shows for illustrative purposes only an example of a local health department sanitizing crew of one embodiment. FIG. 9 shows a continuation from FIG. 8 showing a local health department sanitizing crew power spraying disinfectant to sanitize social distancing application reported virus detected outdoor locations 900. The local health department sanitizing crew was dispatched to this outdoor location because of the reported detection of a virus at that location from a user 100 using the spectrometer 700 of FIG. 7 coupled to the shoes the user 100 was wearing while walking to do essential shopping.

Virus contamination in an outdoor location may be attributable to people who are infected and may not be showing any symptoms spitting on the sidewalk or cough and sneezing which may project bodily fluids onto the sidewalk. People walking on the sidewalk may not be aware that the virus can attach to their shoes and be carried home with them and contaminate their home raising the risk of being infected. The user 100 has sprayed nano particles of copper metal onto the soles of shoes and other exposed shoe surfaces. The nano particles of copper metal will kill the virus. Other people may not have made that provision to add to their level of protection to prevent infection of one embodiment.

Drug Store Closed for Sanitizing;

FIG. 10 shows for illustrative purposes only an example of a drug store closed for sanitizing of one embodiment. FIG. 10 shows a continuation from FIG. 8 where a drug store 1000 that was ordered to close by a local health department. A user 100 of FIG. 1 with the social distancing application 103 of FIG. 1 on the user's cell phone 102 of FIG. 1 reported detecting a virus contamination detected using the spectrometer 700 of FIG. 7 coupled to the shoes the user 100 was wearing while walking through the drug store. The drug store closed and posted a sign notifying customers "Closed for sanitizing. We open at 6:00 am" 1010. The detection and reporting of the virus and local health department ordering the closure of the store for sanitizing will reduce the probable infection of a number of people who were likely to not be aware of the presence of the virus inside the store of one embodiment.

Decontamination Booth:

FIG. 11 shows for illustrative purposes only an example of a decontamination booth of one embodiment. FIG. 11 shows a decontamination booth is activated using the social distancing application 1100. A decontamination booth is located at the entry to a user's home 1110. A decontamination booth is located at the entry to a business 1120. The business owner can designate an employee to operate the decontamination booth for customers and business visitors to assist them in the process. The decontamination booth is configured with ultraviolet lights, copper bristled brushes, and other disinfecting devices 1130.

In one embodiment copper bristled brushes are motorized to rotate against the soles of the person's shoes and against the other shoe surfaces 1140. In another embodiment flexible bristles coated with copper are used to press against the person's clothing in a back and forth action and are moved up and down the extents of the clothes 1150. UV lights are projected below the knees to prevent them from shining into the person's eyes 1160 to expose the lower torso and clothing to a disinfecting use while the person is in the decontamination booth.

A person places their hands under a spout of a hand sanitizer dispenser and the person is instructed to rub the sanitizer over their entire hands and wrists 1170. During the decontamination process air blowers are forcing the interior air to the outside through a series of copper meshes 1180 to force any contaminants in the booth out and sanitize the air being exhausted using the series of copper meshes of one embodiment.

Drone Aerosol Sensors:

FIG. 12 shows a block diagram of an overview of drone aerosol sensors of one embodiment. FIG. 12 shows the aerial drone including sensors to detect and measure aerosols in an area 1200. Aerosols include chemicals, and biologics including DNA 1210. The aerial drone includes sensors to detect and measure electromagnetic fields including manmade and natural electromagnetic fields 1220. The aerial drone includes cellular communications devices to transmit the sensor detected and measured aerosols and electromagnetic fields including GPS coordinates of the detection location(s) 1230. The aerial drone includes sensors coupled to digital processors, databases, artificial intelligence devices, to analyze and identify manmade, animal and environmental objects and conditions using computer vision 1240. The sensors include sound detection and identification devices to detect for example manmade sounds including firearm discharges, explosions, vehicle backfires, and other unnatural sounds which could indicate danger to the user 1250. The descriptions are continued in FIG. 13.

Drone Digital Processors and Databases:

FIG. 13 shows a block diagram of an overview of drone digital processors and databases of one embodiment. FIG. 13 shows a continuation from FIG. 12 showing the aerial drone cameras can be directed to the sounds and the cause of the unnatural sound may be identified for example rifles and persons carrying the rifles identified as hunters based on their type of clothing 1300. The aerial drone sensors coupled to digital processors and databases can analyze and identify animals in close proximity to the user for example wild life including dogs, deer, bears, wolves and other animals some of which may pose danger to the user 1310. The sensors include Light Detection and Ranging (LIDAR) to detect natural physical conditions for example potential avalanches in snow packed terrain, potential rock slides, dense plant growth obscuring pits, drop-offs and other dangerous conditions in the path of the user 1320. The aerial drone sensors can analyze and identify potential safe passable walking paths for the user to follow to avoid dangerous natural conditions 1330. The aerial drone sensors include barometric pressure, humidity, ambient temperature, wind speed and direction devices to determine potential weather changes to alert the user of possible inclement weather for example storms, snow, rain and other conditions that may pose danger to the user 1340.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. An apparatus, comprising:

an aerial drone wirelessly coupled to an application operating on an electronic device of a user;

a plurality of solar cell panels coupled to at least one rechargeable battery of the aerial drone and configured to use solar energy to recharge the at least one rechargeable battery;

a navigation guidance device coupled to the aerial drone and the application and configured to navigate the aerial drone to a predetermined location while avoiding colliding with objects;

a Light Detection and Ranging (LIDAR) detection device coupled to the aerial drone and configured to capture LIDAR data comprised of three-dimensional images of terrain, structures, living objects, stationary objects, and moving objects while the aerial drone is navigating to the predetermined location;

at least one sensor coupled to the aerial drone and configured to detect and measure atmospheric components while the aerial drone is navigating to the predetermined location; and wherein the application is configured to determine hazards associated with the LIDAR data and the atmospheric components and alert the user of the hazards.

2. The apparatus of claim 1, wherein the at least one sensor comprises a plurality of sensors integrated with the aerial drone and configured to detect hazardous aerosol chemicals.

3. The apparatus of claim 1, further comprising at least one infrared camera.

4. The apparatus of claim 1, further comprising a collision avoidance device coupled to the navigation guidance device and having at least one camera and at least one sensor including a proximity sensor configured to detect obstructive objects and to control and navigate the aerial drone to automatically avoid colliding with objects.

5. The apparatus of claim 1, further comprising an augmented reality (AR) feature of the application operating on a user's electronic drone control system configured to allow the user to create an augmented reality (AR) three-dimensional view of the LIDAR captured images.

6. The apparatus of claim 1, wherein the application is configured to analyze and identify the living objects and classify the living objects as dangerous animals.

7. The apparatus of claim 1, wherein the application is configured to analyze and identify the terrain, structures, living objects, stationary objects, and moving objects and classify each terrain, structure, living object, stationary object, and moving object as hazardous or non-hazardous.

8. An apparatus, comprising:

an aerial drone wirelessly coupled to an application operating on an electronic device of a user;

a global positioning satellite (GPS) communication device connected to the aerial drone and configured to record GPS location coordinates of the aerial drone;

a satellite communication component integrated with the aerial drone and configured to wirelessly couple the aerial drone to the application of the electronic device via a satellite communication system;

a plurality of solar cell panels coupled to at least one rechargeable battery of the aerial drone and configured to use solar energy to recharge the at least one rechargeable battery;

a navigation guidance device coupled to the aerial drone and the application and configured to navigate the aerial drone to a predetermined location while avoiding colliding with objects;

a Light Detection and Ranging (LIDAR) detection device coupled to the aerial drone and configured to capture LIDAR data comprised of three-dimensional images of terrain, structures, living object, stationary objects, and moving objects while the aerial drone is navigating to the predetermined location;

at least one sensor coupled to the aerial drone and configured to detect and measure atmospheric components while the aerial drone is navigating to the predetermined location; and wherein the application is configured to determine hazards associated with the LIDAR data and the atmospheric components and alert the user of the hazards.

9. The apparatus of claim 8, wherein the at least one sensor comprises a plurality of sensors integrated with the aerial drone and configured to detect hazardous aerosol chemicals.

10. The apparatus of claim 8, further comprising further comprising at least one infrared camera.

11. The apparatus of claim 8, further comprising a collision avoidance device coupled to the aerial drone and having at least one camera and at least one sensor including a proximity sensor configured to detect obstructive objects and to control and navigate the aerial drone to automatically avoid colliding with objects.

12. The apparatus of claim 11, further comprising and an augmented reality (AR) module configured to allow the user to create an augmented reality (AR) three-dimensional view of the LIDAR data to visualize hazards associated with the LIDAR data and the atmospheric components.

13. The apparatus of claim 8, wherein the application is configured to analyze and identify the living objects and classify the living objects as dangerous animals.

14. The apparatus of claim 8, wherein the application is configured to analyze and identify the terrain, structures, living objects, stationary objects, and moving objects and classify each terrain, structure, living object, stationary object, and moving object as hazardous or non-hazardous.

15. An apparatus, comprising:

an aerial drone wirelessly coupled to a mobile application operating on a mobile device of a user;

a global positioning satellite (GPS) communication device connected to the aerial drone and configured to record GPS location coordinates of the aerial drone and report the GPS location coordinates to the mobile application;

a plurality of solar cell panels coupled to at least one rechargeable battery of the aerial drone and configured to use solar energy to recharge the at least one rechargeable battery;

a navigation guidance device coupled to the global positioning satellite (GPS) communication device and the mobile application and configured to navigate the aerial drone to a predetermined location while avoiding colliding with objects;

a Light Detection and Ranging (LIDAR) detection device coupled to the aerial drone and configured to capture LIDAR data comprised of three-dimensional images of terrain, structures, living object, stationary objects, and moving objects while the aerial drone is navigating to the predetermined location;

at least one sensor coupled to the aerial drone and configured to detect and measure atmospheric components while the aerial drone is navigating to the predetermined location; and wherein the mobile application is configured to determine hazards associated with the LIDAR data and the atmospheric components and alert the user of the hazards.

16. The apparatus of claim 15, further comprising a collision avoidance device coupled to the navigation guidance device and having at least one camera and at least one sensor including a proximity sensor configured to detect obstructive objects and to control and navigate the aerial drone to automatically avoid colliding with objects.

17. The apparatus of claim 15, wherein the mobile application is configured to analyze and identify the terrain, structures, living objects, stationary objects, and moving objects and classify each terrain, structure, living object, stationary object, and moving object as hazardous or non-hazardous.

18. The apparatus of claim 15, wherein the at least one sensor comprises a plurality of sensors integrated with the aerial drone and configured to detect hazardous aerosol chemicals.

19. The apparatus of claim 15, further comprising and an augmented reality (AR) module configured to allow the user to create an augmented reality (AR) three-dimensional view of the LIDAR data to visualize hazards associated with the LIDAR data and the atmospheric components.

20. The apparatus of claim 15, further comprising an emergency alert device coupled to the sensor and configured to automatically alert the user and a predetermined third party of a detected hazardous atmospheric component and a location of the detected hazardous atmospheric component.

* * * * *